A. W. WOODWARD.
VEHICLE WHEEL.
APPLICATION FILED NOV. 23, 1918.
1,305,761. Patented June 3, 1919.
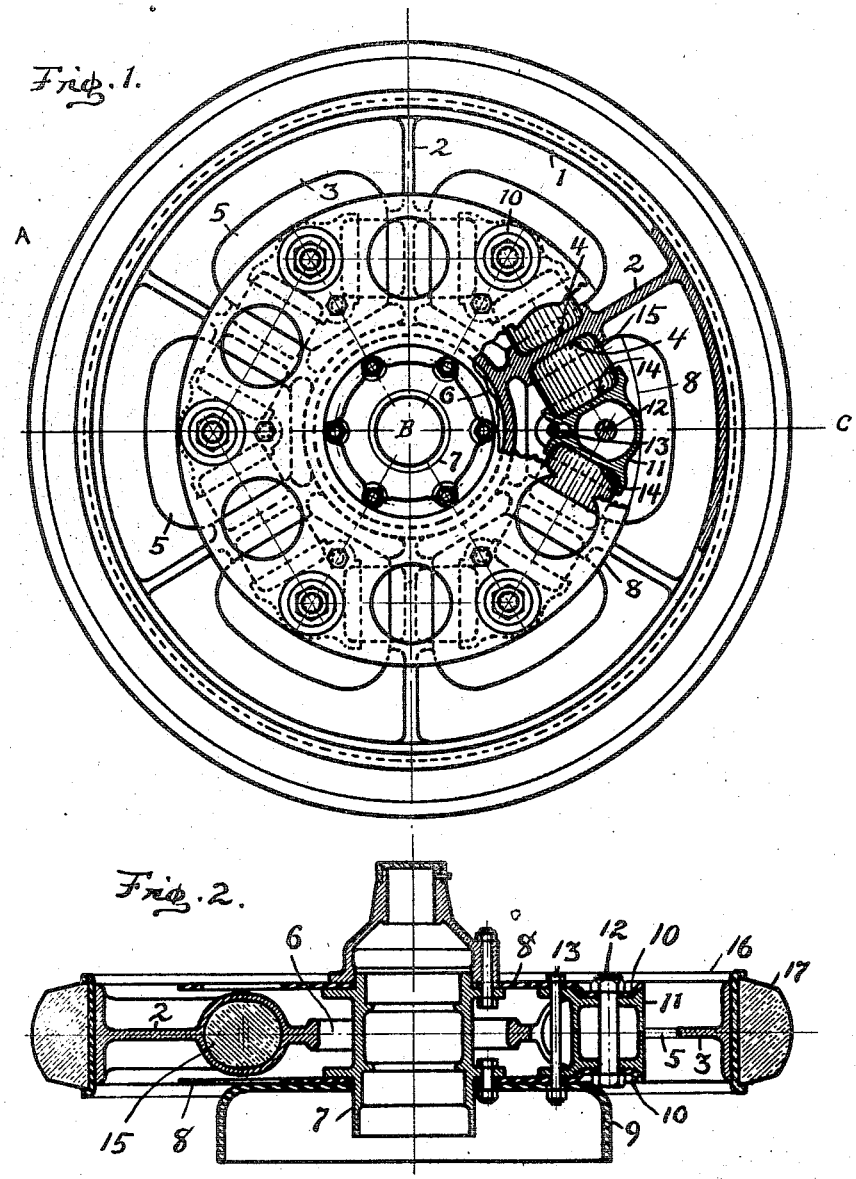

UNITED STATES PATENT OFFICE.

ALVA WEISELL WOODWARD, OF AKRON, OHIO.

VEHICLE-WHEEL.

1,305,761.  Specification of Letters Patent.  Patented June 3, 1919.

Application filed November 23, 1918. Serial No. 263,808.

*To all whom it may concern:*

Be it known that I, ALVA W. WOODWARD, a citizen of the United States of America, and resident of 696 Thayer St., Akron, in the county of Summit and State of Ohio, have invented certain new and useful Improvements in Vehicle-Wheels, of which the following is a specification.

This invention relates to improvements in wheels of that class used on truck and other vehicles, and in which resilient members are interposed between the rim of the wheel and its hub. The object of the invention is to afford a compact construction of great strength and neat appearance, and which will admit of the required absorption of vibrations between the hub and rim of the wheel in all directions.

The objects of the improvement are accomplished by the construction illustrated in the accompanying drawings in which:

Figure 1 is a side elevation of a wheel embodying the invention; and

Fig. 2 is a cross-section of Fig. 1 on the lines A—B—C thereof.

Similar numerals of reference indicate corresponding parts in both views, and referring now to the same:

The wheel proper is comprised of an outer member 1, having radial spokes 2 and a web 3 extending between the spokes. Each spoke has oppositely disposed seats 4 arranged in a plane at right angles to that of the wheel. The web 3 has a series of openings 5 each being located correspondingly between the spokes. The outer member has also a central opening 6. The wheel has also an inner member comprised of a hub 7 having secured thereto two radially disposed flanges 8, extending one upon each side of the wheel and a brake-drum 9 is also secured to the hub and to the adjacent flange 8. Each flange has near its outer edge a convolute series of indentations 10 pressed therein that project inwardly, the indentations of one flange being disposed opposite those of the other. Between said flanges, and extending through the openings 5 are secured an annular series of supporting blocks 11, each being shaped in its opposite lateral faces so as to fit the indentations 10 of the corresponding flanges, and said blocks are each secured to said flanges by bolts 12 and 13. Each block has also a pair of seats 14, each being disposed in a plane parallel with the corresponding seat on the adjacent spoke. An annular series of resilient members 15 are arranged interveningly between said blocks and spokes, each member comprising a rubber cushion of cylindrical form with its opposite ends bearing in the correspondingly opposite seats 4 and 14 of the respective spoke and block. Thus, the hub, together with its flanges and intervening blocks are held in suspension upon said resilient members centrally within the outer member.

The wheel thus constructed is surmounted by a removable rim 16 in which is seated a tire 17 of usual construction.

In operation, the weight borne by the axle is imparted to the outer wheel member through the medium of the cushions, which, because of their resilient nature, absorb vibrations that are occasioned by the travel of the wheel. The cushions may be other than of cylindrical form, and if so desired springs may be substituted therefor without material departure from the spirit of the invention.

What I claim is:—

1. In a vehicle wheel an outer member having spokes and a central opening, there being an apertured web extending between the spokes, and each spoke having oppositely disposed seats resident in planes at right angles to that of the wheel; a hub having flanges, one on each side of the wheel and having each an annular series of indentations, those on the one flange being situated opposite those of the other; a series of blocks shaped to receive at each side thereof the indentations of the corresponding flanges and being secured in connection therewith, said blocks having also opposite seats resident in planes respectively parallel with those on the adjacent spokes; and a series of resilient members interposed in said seats between the adjacent spokes and blocks.

2. In a vehicle wheel an outer member having spokes and a central opening, each spoke having oppositely disposed seats resident in respective planes extending at right angles to that of the wheel; a hub extending through the opening in the outer member, and having two flanges, one extending on each side of the wheel; a convolute series of blocks secured rigidly between said flanges, and each block having opposite seats resident respectively in planes parallel with the corresponding seats on the adjacent spokes; and a series of resilient members interposed in said seats between the adjacent spokes and blocks.

In testimony whereof I affix my signature, in presence of two witnesses.

ALVA WEISELL WOODWARD.

Witnesses:
MATILDA METTLES,
W. G. BURNS.